INVENTORS
FAY C. SMITH
AND
EMERSON W. YORK
BY
ATTORNEYS

July 10, 1951

E. W. YORK ET AL 2,560,047

APPARATUS FOR ELECTROSTATICALLY DEPOSITING
GAS-SUSPENDED SOLIDS

Filed Sept. 20, 1947

INVENTORS.
FAY C. SMITH
AND
EMERSON W. YORK

BY

ATTORNEYS.

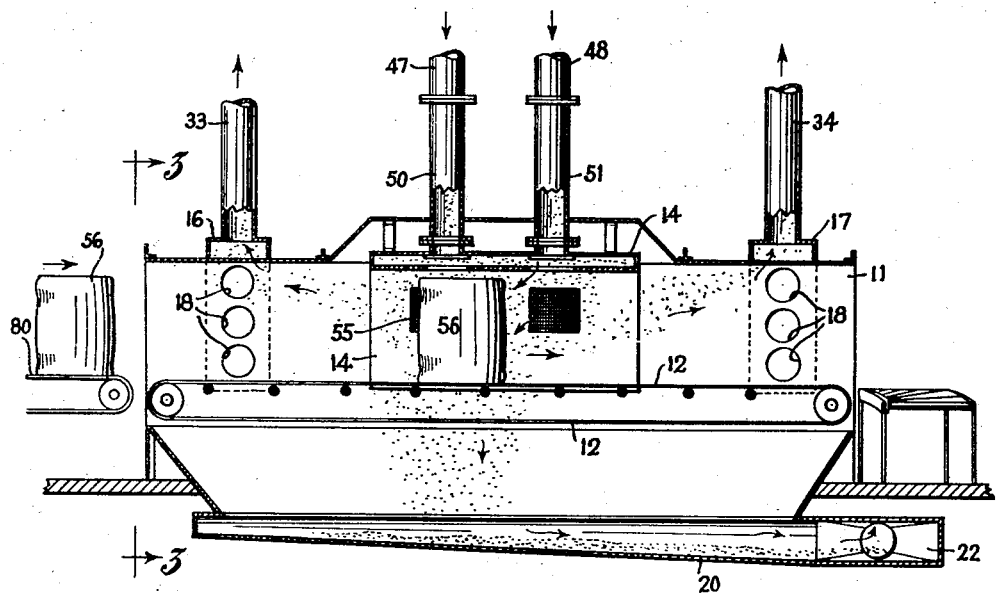
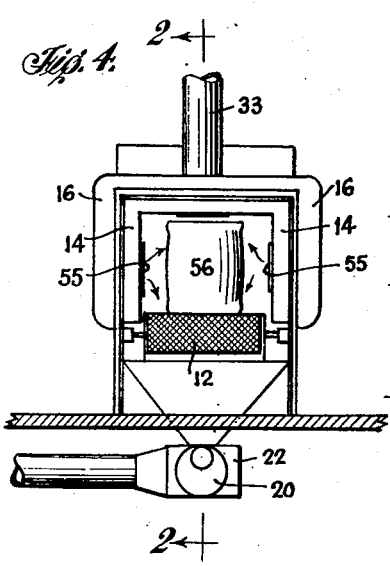
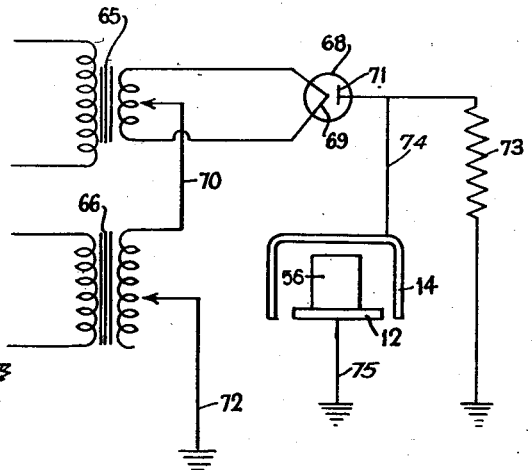
INVENTORS
FAY C. SMITH
AND
EMERSON W. YORK
BY
ATTORNEYS

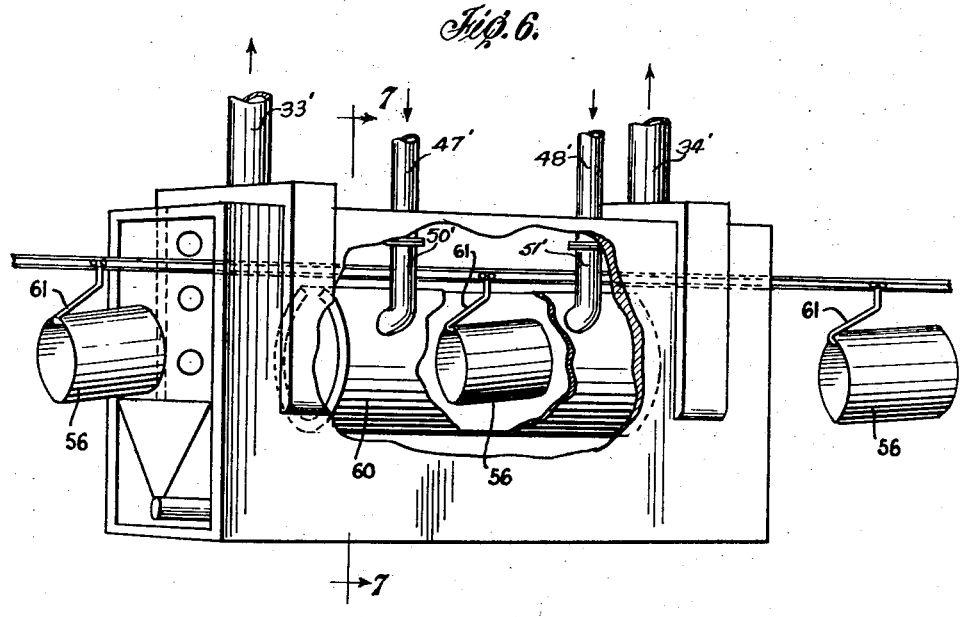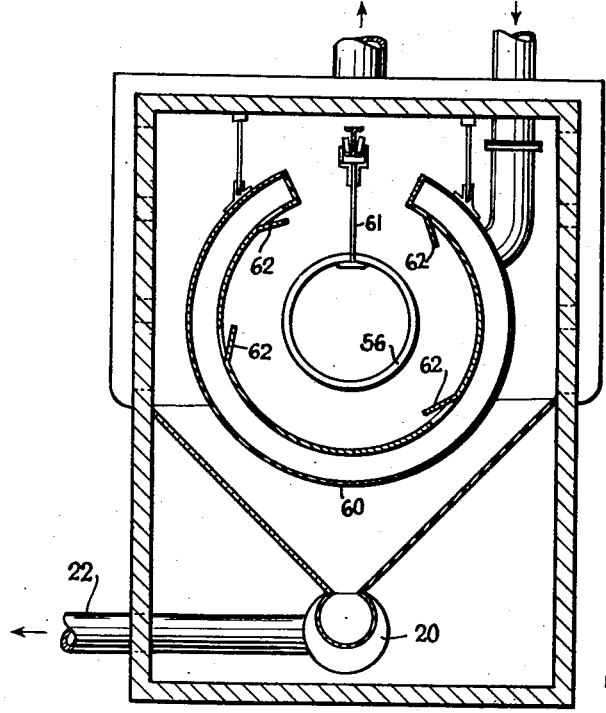

Patented July 10, 1951

2,560,047

UNITED STATES PATENT OFFICE 2,560,047

APPARATUS FOR ELECTROSTATICALLY DEPOSITING GAS-SUSPENDED SOLIDS

Emerson W. York and Fay C. Smith, Akron, Ohio, assignors to The Firestone Tire & Rubber Company, Akron, Ohio, a corporation of Ohio Application September 20, 1947, Serial No. 775,254

9 Claims. (Cl. 91—18)

This invention relates to improvements in the art of dusting. More particularly it relates to a method and apparatus for applying fine mesh air-suspended materials to the outer surfaces of articles such as for example the distribution of soap-stone dust upon uncured pneumatic bodies.

In many manufacturing processes comprising multiple steps, dusting the partly finished product during an early step is advantageous for the purpose of expediting processing of the material through the following steps. In the normal procedure of tire manufacturing, for example, tire bodies are formed of rubberized fabric on a collapsible drum to provide a cylindrical "green" tire, prior to final shaping. An uncured tread strip is applied to the outer surface just before removing the tire from the drum. Up to this point tack is desired in the partly fabricated tire body and the tire forming materials. However, the tire is completely assembled with respect to materials as it leaves the drum and a tacky surface is no longer of any utility. Since the tire is subjected thereafter to considerable processing and handling it is important to eliminate tack in the uncured tire surface. This is accomplished by applying soapstone to the tire exterior. The purposes of this treatment are to prevent unwanted material such as dirt and scraps from attaching to the surface of the finished tire, to minimize molding defects on the exterior of the tire, and to cause the tire to be more easily handled during remaining manufacturing operations. This treatment is by no means limited to the manufacture of pneumatic tires but is used also in the manufacture of many other articles made from rubber or rubber-like materials as well as from non-elastic plastic materials.

A common procedure for applying soapstone dust to uncured tires involves manually lifting the tires from a continuous conveyor to a platform about two feet from the floor level and applying the dust manually by rubbing the exterior surface of the tire with a dust-laden pad formed from sheepskin or other loosely constructed material. The tire after being so dusted, is manually placed upon another conveyor. The soapstone dusting operation on a single conveyor system within a tire plant may require the constant attendance of two or three workmen. The portion of the factory housing this operation is necessarily dusty and difficult to keep tidy. Moreover, the workmen within this region are subjected to a dusty and unhealthful atmosphere. Considering the operation from the standpoint of plant layout, the conveyor system carrying the tires to and from the area of dust application is interrupted and made more complicated thereby.

It is an object of this invention, therefore, to provide a simple compact apparatus whereby the articles are not removed from a continuous conveyor during dusting.

It is an object also to provide a method whereby the manual application of dust to the exterior surface of an article is eliminated by the substitution of relatively simple electrostatic means.

It is an object also to simplify the conveyor systems used in the manufacturing of articles which require dusting during their assembly.

It is an object substantially to reduce the cost of applying dust by eliminating manual operations and by reducing the required amount of dusting compound.

It is an object specifically to adapt the present invention to the manufacturing of pneumatic tires.

The above and other objects ancillary thereto are fulfilled by providing an apparatus and a method for effecting deposition of electrically charged dust particles of one polarity upon articles which are maintained at an opposite polarity.

In the drawings wherein like parts are identified by the same reference characters:

Fig. 3 is a side elevation partially in section to illustrate a dust distributing electrode adapted for use with a belt type conveyor;

Fig. 4 is an end view of the embodiment shown in Fig. 3;

Fig. 5 is a schematic diagram illustrating the electrical circuit employed by the invention;

Fig. 6 is a side elevation in partial section illustrating a dust distributing electrode adapted for use with an overhead type conveyor; and Fig. 7 is an end view of the embodiment shown in Fig. 6.

According to the invention particles of the soapstone dusting material are picked up by a high velocity gaseous stream and circulated through a region enclosed by an electrical conductor wherein the dust particles acquire an electrical charge. The invention contemplates employement of a chambered member through which the dust particles pass to acquire the desired charge. The charging electrodes may conveniently be maintained at a potential difference of 5,000 to 15,000 volts although not limited thereto. The charged dust particles are projected from the first mentioned electrode in the general direction of the oppositely charged article by pneumatic means.

Figure 1:
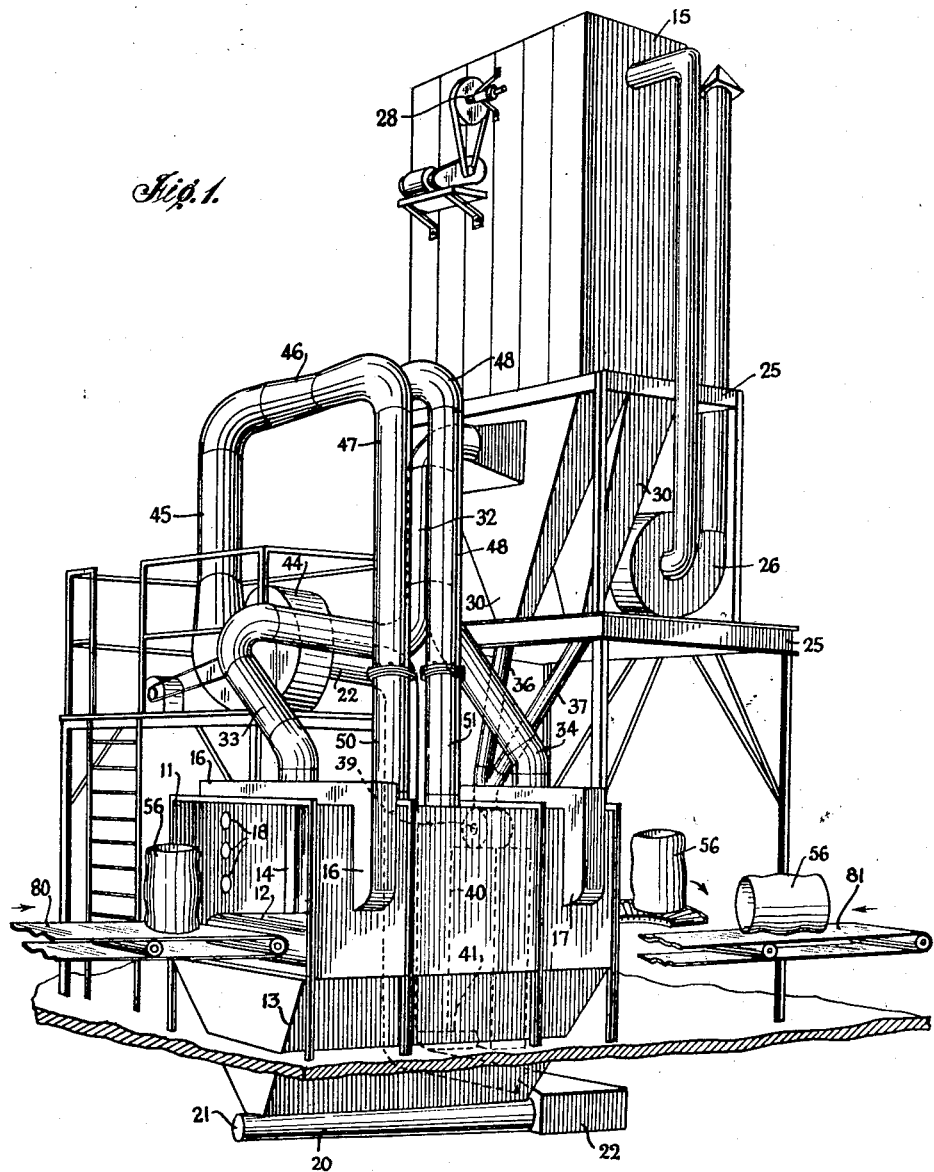
Fig. 1 is an illustration in perspective of apparatus embodying the invention including a system for recirculating excess dust, the apparatus being particularly adapted to tire manufacturing.

Referring specifically to Fig. 1, the apparatus shown therein has as a principal function the electrostatic deposition of soapstone dust upon uncured and unmolded tires within a work-receiving tunnel 11 shown in the lower foreground position. Ancillary functions include (1) recirculating excess air-dust mixture, (2) preventing the escape of dust from apparatus into surrounding factory space by creating slightly vacuum conditions at openings into the dust depositing region by removal of air-dust mixture within said region near the openings, (3) separating the dust from the mixture removed near said openings in a housing 15 in the upper background, (4) and returning the dust by gravity to the air-dust recirculating system.

The tunnel 11 houses a coextensive horizontal metallic belt tightened conveyor 12 aligned with a work receiving conveyor 80 to convey the partly finished tire through tunnel 11 from left to right according to the drawing, and deposit the work, after dusting, on a work removing conveyor 81. A shell type electrode 14, U-shaped in cross-section, best illustrated in Figures 3 and 4, is supported within the tunnel to substantially enclose the conveyor 12. Inverted U-shaped ducts 16 and 17 are provided for withdrawing dust-laden air from tunnel 11 near the work entrance and exit thereof. The air-dust mixture enters the ducts 16 and 17 through openings 18 provided in the walls of tunnel 11. The lower part of housing 11 is a trough-like structure, V-shaped in cross section, the lower terminus of which leads into a frusto-conical shroud 20. The junction of shroud 20 and tunnel 11 is inversely graduated axially for draft equalization under applied vacuum.

Figure 2:
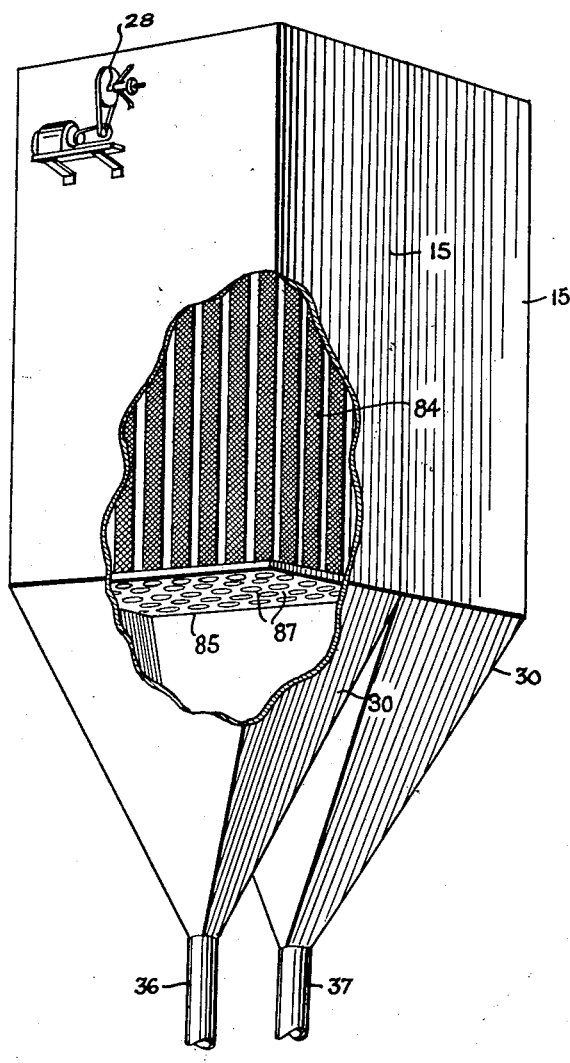
Fig. 2 is an enlarged cutaway view in perspective illustrating a portion of the dust separating apparatus shown in Fig. 1.

An elevated platform 25 provides support for a conventional dust collecting filter unit. An exhaust fan 26 creates subatmospheric pressure within the housing in which is disposed a plurality of conventional fabric dust filtering tubes 84 shown best in Fig. 2. As the air-dust mixture enters tubes 84 from the inverted pyramidal housings 30, 30 which also function as dust hoppers, the air escapes through the fabric tubes to the lower pressure region within the housing 15 while the dust is retained within the tubes. The dust is dislodged from the interior of the fabric tube 84 by a continuously operating shaking device 28. The lower ends of the fabric tubes are attached to and support a horizontal floor-like member 85 which seals the region within the hoppers 30, 30 from the space within the housing 15 which lies exteriorly of the fabric tubes and has openings 87 communicating with each end of the fabric tubes. The hoppers 30 serve also to receive air-dust mixture which is withdrawn through tubes 32, 33 and 34 from the tunnel 11. Flow of air or air-dust mixture through the dust reclaiming apparatus is obtained by means of the vacuum created by the exhaust fan 26. The dust reclaiming apparatus is arranged, valved and automatically controlled so that the air-dust mixture may be drawn into one half of the fabric tubes while the other half is being shaken free of accumulated dust. After a few minutes an automatic controller (not shown) changes the flow of air-dust mixture into one set of fabric tubes and the dust is shaken from the other set. It will be understood that all of the tubes may be shaken continuously but that dust is not readily shaken therefrom unless the flow of air through the fabric tube walls is stopped in that portion from which the dust is to be removed.

The dust which collects in the hoppers 30, 30 is removed from the bottom thereof by ducts 36 and 37 into an automatically controlled power driven rotary valve 39. Valve 39 delivers the dust into a standard Syntron feeder 40, which feeds a constant and uniform quantity of dust into the duct 41. The Syntron feeder is provided with an auxiliary bin for the reception of dust to be added to the apparatus. A small stream of the dusting material enters the recirculating system from this bin through the Syntron feeder to make up for that which leaves the apparatus by adhering to the tires or articles being dusted. Duct 41 opens into the duct 22; dust is removed from duct 41 by the inrush of air from the atmosphere through a damper valve (not shown) located near the point at which the Syntron feeder discharges into duct 41. The air current in duct 41 occurs as a result of sub-atmospheric pressure existing within the duct 22. It will be noted that duct 22 is in fluid connection with the intake portion of fan 44. Air-dust mixture is forced by fan 44 through duct 45 which divides in a Y fitting 46 into ducts 47 and 48. Ducts 47 and 48 make fluid connection with the dust distributing electrode 14 by electrical insulating couplings 50 and 51 shown more clearly in Fig. 3.

Couplings 50 and 51 are of a nonconducting dielectric material of sufficient length so that the tubular connecting portions of electrode 14 effecting fluid connection with the ducts 47 and 48 may be spaced sufficiently far apart to prevent current leakage or arcing from the electrode 14 to the ducts 47 and 48. The couplings may be of rubber or other dielectric material. In one installation embodying the invention, pipes three feet long form the couplings 50 and 51 and effectively prevent any current leakage from the electrode 14 or 60 to grounded ducts 47 and 48.

Referring to Figures 1, 3 and 4, it is seen that dust-air mixture entering tunnel 11 through conduit-like electrode 14 is drawn from the tunnel by two separate recirculating systems. The dust-laden air drawn from tunnel 11 through duct 22 by suction fan 44 is circulated through duct 45 and through a pair of ducts 47 and 48 leading therefrom to enter the housing type electrode 14 at points spaced in respect to the longitudinal axis thereof. The portion of air-dust mixture withdrawn at both end portions of chamber 11 through the ducts 33 and 34 is carried into the separator 15, already described. Separator 15 serves to separate the dust-air mixture, i. e., to discharge the air to the atmosphere and return only the dust to the dusting apparatus. The dust is returned in continuous and unvarying quantity to duct 22 through duct 41 whereby it enters the dust recirculating system first described in this paragraph in the manner already described.

Figs. 3 and 6 illustrate two different types of electrodes that are employed to distribute electrically charged dust particles about the dust receiving articles. Fig. 3 and also Fig. 4 show a shell type inverted U-shaped electrode 14 built of sheet metal. The electrode 14 straddles the path of a work carrying belt-like conveyor. The air-dust mixture enters the shell type electrode 14 through the tubes 47 and 48 and after passing through the chambered section thereof, at which time the dust particles acquire an electric charge, dust laden air passes through the louvred inside walls and toward the oppositely charged tire 56 resting on the conveyor 12. The embodiment shown in Figs. 3 and 4 is particularly useful where the articles to be dusted are carried by a belt type conveyor. Where articles such as tires are supported on hooks suspended from an overhead conveyor or chain, the embodiment shown in Figs. 6 and 7 is more suitable. Figs. 6 and 7 illustrate a circularly shape electrode 60 open in the top portion to permit the passage of tire supporting conveyor members 61. The louvers 62 are so located and arranged on the inside wall of electrode 60 that air-dust mixture on being discharged therefrom will travel in a circular path about the tire 56 suspended within the space enclosed by the electrode. In these figures, inlet ducts 47', 48', insulators 50', 51', and outlet ducts 33', 34' perform the same function as the respective elements in Figs. 1 to 4 bearing the corresponding numbers, unprimed.

Fig. 5 illustrates an electrical circuit in use on the present invention and may be employed irrespective of the type of electrodes adopted to obtain distribution of the air-dust mixture. It will be found very practical to use building framework, machinery, etc., as a part of the high voltage circuit. Since the invention is adapted for connection with the usual commercial electrical power lines the apparatus described employs 110 volt alternating current. However, in order that a satisfactory electrostatic field can be established between electrode 14 or 60 and the articles to be dusted, it is essential that the alternating current originating in the secondary coil of the high voltage transformer be rectified. For this purpose a diode rectifying tube 68 is provided. The cathode 69 thereof is heated to incandescence by the current furnished from a suitable alternating current step-down transformer 65. The cathode heating circuit thus formed is electrically connected from a secondary center tap through line 70 to an ungrounded side of a high voltage secondary transformer 66, the opposite side of which is grounded at 72. The anode 71 of diode 68 leads through bleeder resistance 73 to ground. Anode 71 leads to electrode 14 through a lead 74, and conveyor 12 leads to ground through a lead 75, to provide a capacitance in shunt with bleeder resistance 73.

In operation the device functions as follows:

A so-called "green" tire 56, of generally cylindrical form, rests on grounded conveyor 12 to be continuously moved through the space defined by the housing type electrode 14. Dusting powder is continuously fed, as above described, through shell-like electrode 14 to be discharged through outlet louvres 55 into the space intermediate electrodes 12 and 14. During passage through shell-like electrode 14 dusting powder, which may for example comprise talc, mica powder, calcium carbonate or the like assumes a positive charge, electrode 14 bearing maintained at a substantial positive potential, such as 5,000 to 15,000 volts, in the following manner. Diode 68 provides rectifier action in a known manner to deliver pulsating direct current to electrode 14.

Bleeder resistance 73 insures a constant load between anode 71 and the grounded side of transformer 66, and may be of a value sufficiently high to insure only a small current drain, such as one milliampere or less. As above stated electrodes 12 and 14 present a capacitance path to ground which may under some conditions be found adequate to insure current flow between anode and ground sufficient to maintain electrode 14 at a high positive potential through rectification of the output of transformer 66. Bleeder 73 serves the dual function of insuring current flow through diode 68 as well as insuring the discharge of the condenser formed by electrodes 12 and 14 when the power supply is turned off.

Since the tire is at ground potential, as is conveyor 12, the incoming dust passing through louvres 62 and carrying a positive charge will cling to the tire due to electrostatic attraction therebetween. Circulating dust maintains its positive charge or may be recharged by contact with the inner surface of the electrode 14. Precipitated dust falls through conveyor 12 which is preferably of mesh material, and is drawn into the recirculating system as above described.

The conveyor system which supports and transports the tires or other articles to be dusted is grounded to the steel building framework or otherwise in electrical connection with the grounded connection 72 of the transformer 66. At present it will not be found practicable to employ voltages of over approximately 16,000 volts since rectifying tubes of greater capacity are not of standard manufacture. However, to those skilled in the use of electrical power, many variations and methods are available for obtaining the electrostatic field developed by the above described arrangement.

While the present invention embraces the simple principle of electrostatic deposition of dust upon a charged article such as an uncured tire body, the dusting operation would not be successful in a large scale commercial installation were it not for the auxiliary equipment which has been provided so that the operation may be carried on without loss of dust to the surrounding atmosphere or factory space. As a result, economy in dusting material is effected and the system may be installed any place within a factory without creating health and safety hazards or factory cleaning problems. The use of the invention has been hitherto unknown in the rubber products industry but is at present being adopted as regular equipment in the application of talc dust to uncured tire bodies in large-scale tire manufacturing operations with attendant substantial saving effected through reduction of labor costs.

The invention has been described with respect to certain embodiments, but obviously modification may be resorted to without departing from the spirit of the invention or the scope thereof as defined by the appended claims.

What is claimed is:

1. In apparatus for applying a dust-like material to the surface of an article, a metallic conveyor for transporting the article, a high-voltage rectified current generating means, an electrode comprising a shell-type sheet-metal structure substantially housing said conveyor and including inner and outer walls, said inner walls being provided with apertures for the discharge of dust from the space intermediate said walls, a duct with one end portion in fluid but electrically insulated connection with said electrode, pumping means in fluid connection with the other end portion of the duct for propelling air-dust mixture through the duct and electrode, and means for electrically connecting said generating means across said conveyor and electrode.

2. Apparatus for applying an air-suspended solid material to the surface of an article which includes a high voltage generating means including a pair of output terminals, a conveyor capable of conducting an electrical current, an electrode comprising a shell-type structure of electrical current conducting material with inner and outer walls which substantially encloses a portion of the conveyor with an article supported thereupon, openings through the inner walls of the electrode, a pumping means for propelling an air-dust mixture to the spaces between the walls of the electrode, a duct in fluid connection with the shell-type structure and the pumping means, a portion of said duct being constructed from an electrically insulating material, means connecting one terminal of the generating means with the electrode, an electrical connector for attaching the opposite pole of the generating means to the conveyor, and metering means for feeding dust to the pumping means.

3. In a device for the electrostatic deposition of dust on an article, an electrode comprising an electrically conducting elongated double walled shell defining a chamber in the form of a partial cylinder with end closures between the double walls thereof, louvered inner walls permitting fluid communication between the interior of said chamber and the space confined by the inner walls thereof, means for the introduction of fluid entrained particles to the interior of said chamber, and means to establish an electric potential on said electrode.

4. Apparatus for applying dusting powder to an article, said apparatus including an open-ended housing of an electrically conductive material adapted to enclose said article, said housing including an inner wall and an outer wall spaced therefrom to define a chamber therebetween, said inner wall being provided with an aperture providing a port between said defined chamber and the space enclosed by said housing, an article-supporting member of electrically conductive material disposed within the area defined by said housing in electrically insulated relation to said housing, means maintaining said housing and said article-supporting member at a difference of potential, means for introducing a pneumatic stream into the chamber defined by the spaced walls of said housing and spaced from said inner wall aperture to effect flow through a portion of said chamber prior to escape through said aperture, and means for entraining dust particles in said stream prior to the introduction thereof to said chamber.

5. In apparatus for applying a dust-like material to the surface of an article, a metallic conveyor for transporting the article, an electrode comprising a shell type sheet metal structure substantially housing said conveyor and including spaced apart inner and outer walls, said inner walls being provided with apertures for the discharge of dust therethrough from the space between said walls, a duct leading into said electrode through the outer wall thereof and in electrically insulated relation to said electrode, means associated with said duct for forcing an air-dust mixture into the space between the walls of said electrode, and means for generating a high voltage rectified current, for maintaining said electrode at a difference of potential in respect to said conveyor, whereby the dust particles of said mixture are charged at opposite polarity to said conveyor and the articles supported thereon, for the deposition of said particles on said articles.

6. Apparatus for applying an air-suspended, solid material to the surface of an article which comprises, a housing, a conveyor passing through the housing and capable of conducting an electrical current, a high-voltage, direct-current generating means, a hollow electrode in said housing comprising a shell-type structure of electrical-current-conducting material having inner and outer walls defining a partial enclosure for said conveyor and the article supported thereupon, the inner walls of said electrodes being apertured, means for conducting an air-dust mixture to the area within the electrode, means for electrically connecting one pole of the generating means with the electrode, means for connecting the opposite pole of the generating means to the conveyor, pneumatic means for feeding an air-dust mixture to and through said means for conducting, ducts leading from the housing for withdrawing air-dust mixture, separating means in fluid connection with the said ducts for removing the solid material from the air-dust mixture, a duct leading from the bottom portion of the housing to the said pneumatic means, and an air pump having an inlet port in fluid communication with said separating means, and an outlet port open to the atmosphere.

7. An apparatus for electrostatically depositing gas-suspended solids upon an article, comprising a segmental double-wall electrode of current-conducting material defining a chamber having an opening communicating with the space inwardly of said electrode, high voltage, direct-current-generating means, means for propelling an air-dust mixture through the chamber defined by said electrode and through said opening into contact with said article, current-conducting means for supporting the article, and means for electrically connecting the generating means to the said current-conducting, supporting means and to said electrode.

8. An apparatus for electrostatically depositing soapstone dust upon tires, comprising a continuously moving conveyor having tire-supporting elements and comprising electrically conducting material, high voltage, direct-current-generating means, a segmented, cylindrical, double-wall, current-conducting electrode at least partially enclosing said conveyor and defining a partially tubular chamber between the double walls thereof, means connecting said generating means between said conveyor and said electrode to establish a potential difference therebetween, said electrode being discontinuous at its top portion to provide an axially directed channel along which said tire-supporting elements of said conveyor may pass, and means to force air-borne dust into said chamber, the inner walls of said chamber having openings for passage of said dust to tires conveyed through said electrode.

9. An apparatus for electrostatically depositing gas-suspended solids upon an article including a double-wall electrode of current-conducting material defining a chamber having an opening communicating with the space inwardly of said electrode, high voltage direct-current-generating means, means for propelling an air-dust mixture through the chamber defined by said electrode, and through said opening into contact with said article, current-conducting means for supporting the article, and means for electrically connecting the generating means to the said current-conducting supporting means and to the electrode, said double-walled electrode comprising a segmented cylinder having spaced, free ends, and said current-conducting means comprising a conveyor having an article-suspending portion extending through the space between said free ends to permit movement of a suspended article along said electrode, interiorly thereof.

EMERSON W. YORK.
FAY C. SMITH.

REFERENCES CITED

The following references are of record in the file of this patent:

UNITED STATES PATENTS

| Number | Name | Date |
|---|---|---|
| 1,788,600 | Smyser | Jan. 13, 1931 |
| 1,976,596 | Austin | Oct. 9, 1934 |
| 2,047,525 | Thode | July 14, 1936 |
| 2,097,233 | Meston | Oct. 26, 1937 |
| 2,362,653 | McGovern | Nov. 14, 1944 |
| 2,426,016 | Gustin | Aug. 19, 1947 |
| 2,428,991 | Ransburg | Oct. 14, 1947 |